(12) United States Patent
Iesaki

(10) Patent No.: US 8,598,816 B2
(45) Date of Patent: Dec. 3, 2013

(54) MOTOR CONTROL APPARATUS AND IMAGE FORMING APPARATUS

(75) Inventor: Kenichi Iesaki, Ichinomiya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 0 days.

(21) Appl. No.: 13/370,562

(22) Filed: Feb. 10, 2012

(65) Prior Publication Data

US 2012/0249036 A1  Oct. 4, 2012

(30) Foreign Application Priority Data

Mar. 31, 2011 (JP) .................................. 2011-079084

(51) Int. Cl.
H02P 5/46 (2006.01)
(52) U.S. Cl.
USPC .................... 318/58; 318/61; 318/64; 318/90
(58) Field of Classification Search
USPC ......... 318/58, 61, 64, 90, 259, 260, 262, 263, 318/270, 266, 466, 467, 468, 469
See application file for complete search history.

(56) References Cited

U.S. PATENT DOCUMENTS

| 7,164,247 | B2 * | 1/2007 | Joe et al. ....................... 318/432 |
| 2010/0123751 | A1 * | 5/2010 | Iesaki .............................. 347/16 |
| 2011/0175281 | A1 * | 7/2011 | Takahashi ...................... 271/227 |

FOREIGN PATENT DOCUMENTS

| JP | 55-7148 A | 1/1980 |
| JP | 55-34852 A | 3/1980 |
| JP | 61-81374 A | 4/1986 |
| JP | 7-177778 A | 7/1995 |
| JP | 10-283012 A | 10/1998 |
| JP | 2000-086037 A | 3/2000 |
| JP | 2003-131713 A | 5/2003 |
| JP | 2007-148648 A | 6/2007 |
| JP | 2008-186405 A | 8/2008 |
| JP | 2008-217405 | 9/2008 |
| JP | 2008217405 A * | 9/2008 |
| JP | 2010-221040 | 10/2010 |

OTHER PUBLICATIONS

Pending U.S. Appl. No. 13/239,583, filed Sep. 22, 2011.
Notification of Reason for Refusal for Japanese Patent Application No. 2011-079084 mailed Jul. 16, 2013.

* cited by examiner

*Primary Examiner* — Eduardo Colon Santana
*Assistant Examiner* — Bickey Dhakal
(74) *Attorney, Agent, or Firm* — Banner & Witcoff, Ltd.

(57) ABSTRACT

A motor control apparatus includes a target acceleration setting unit, a control unit, an acceleration upper limit estimation unit, a mode switching unit, a detection unit and a trajectory setting unit, wherein the mode switching unit controls the target acceleration setting unit to execute a first setting processing, in which the target acceleration at each time point is set corresponding to a first target acceleration trajectory in which the target acceleration at each time point is set corresponding to a first target acceleration trajectory, a second setting processing in which a target acceleration is set corresponding to the acceleration upper limit, or a third setting processing in which the target acceleration is set corresponding to the second target acceleration trajectory, based on the acceleration upper limit, the target acceleration, the speed of the motor.

9 Claims, 9 Drawing Sheets

MOTOR CONTROL APPARATUS AND IMAGE FORMING APPARATUS

CROSS-REFERENCE TO RELATED APPLICATION

This application claims priority from Japanese Patent Application No. 2011-079084 filed on Mar. 31, 2011, the entire subject matter of which is incorporated herein by reference.

TECHNICAL FIELD

This disclosure relates to a motor control apparatus and an image forming apparatus.

BACKGROUND

It is known that an motor control apparatus inputs summed values of a driving current corresponding to target acceleration and a disturbance compensating current corresponding to disturbance estimated by a disturbance observer into a motor, thereby performing a robust acceleration control. Regarding the motor control apparatus of the above-described type, it is known that an apparatus limits the target acceleration to a predetermined range by a limiter.

As well known, torque in a motor is saturated at a limit point. Accordingly, when the target acceleration exceeds an acceleration upper limit by the torque saturation, if any limit is not made, the torque corresponding to the target acceleration is not generated, so that the control becomes unstable. The related art copes with such problem by limiting the target acceleration.

SUMMARY

However, in the above related art, when the target acceleration exceeds the acceleration upper limit, the target acceleration is corrected as shown in a part (a) of FIG. 8, so that it is not possible to obtain the initially purposed acceleration. Therefore, in case that the above technology is applied to a control process of accelerating the motor up to predetermined speed in accordance with a predetermined target profile, the motor cannot be accelerated to the target speed, as shown in a part (b) of FIG. 8, so that the initial purpose will not be achieved. In the meantime, a part (a) of FIG. 8 illustrates a trajectory of a target acceleration in the control process of accelerating the motor to the predetermined speed. In case that the target acceleration is corrected to the acceleration upper limit, a trajectory of the target acceleration is shown with the solid line, and in case that the target acceleration is not corrected, a trajectory of the target acceleration is shown with the broken line. Also, in a part (b) of FIG. 8, in case that the target acceleration is corrected to the acceleration upper limit, a speed trajectory of the motor is shown with the solid line, and in case that the target acceleration is not corrected, a speed trajectory of the motor is shown with the dashed-dotted line.

In view of the above, this disclosure provides a motor control apparatus that accelerates a motor to predetermined speed in accordance with a target profile, corrects target acceleration when torque is saturated, and appropriately accelerate the motor to the predetermined speed even when the correction is made.

With considering above, a motor control apparatus of this disclosure includes a target acceleration setting unit, a control unit, an acceleration upper limit estimation unit, a mode switching unit, a detection unit and a trajectory setting unit, and the motor control apparatus accelerates a motor to target speed by using the above units.

In the motor control apparatus, the target acceleration setting unit sets target acceleration at each time point from start of an acceleration control and the control unit adjusts a control input for the motor based on the target acceleration set by the target acceleration setting unit, thereby controlling the motor.

In the meantime, the acceleration upper limit estimation unit estimates an upper limit of acceleration achievable by the motor, and the mode switching unit uses the acceleration upper limit, and the like, estimated by the acceleration upper limit estimation unit. The mode switching unit switches processing, that is executed by the target acceleration setting unit, in order of first setting processing, second setting processing and third setting processing, as required.

When the first setting processing starts, the target acceleration setting unit sets the target acceleration at each time point in accordance with a target acceleration trajectory from start of predetermined acceleration control in which the target acceleration at the target speed becomes zero. In the meantime, when the second setting processing starts, the target acceleration setting unit sets the target acceleration corresponding to the acceleration upper limit estimated by the acceleration upper limit estimation unit. Also, when the third setting processing starts, the target acceleration setting unit sets the target acceleration in accordance with a target acceleration trajectory which his newly set by the trajectory setting unit.

At the start of the acceleration control, the mode switching unit controls the target acceleration setting unit to execute the first setting processing. When the target acceleration set by the first setting processing exceeds the acceleration upper limit estimated by the acceleration upper limit estimation unit, the mode switching unit controls the target acceleration setting unit to execute the second setting processing, instead of the first setting processing, from that time point.

Also, when the detection unit detects that speed of the motor reaches predetermined reference speed less than the target speed, the mode switching unit controls the target acceleration setting unit to execute the third setting processing, instead of the second setting processing.

When the target acceleration setting unit is executing the second setting processing and the detection unit detects that the speed of the motor reaches the reference speed, the trajectory setting unit newly sets, as a new target acceleration trajectory from that time point, a target acceleration trajectory, in which the target acceleration at the target speed becomes zero, based on a moving state of the motor at that time point.

According to the motor control apparatus configured as described above, when the target acceleration corresponding to the target acceleration trajectory from the start of the predetermined acceleration control exceeds the acceleration upper limit, the target acceleration is limited to the acceleration upper limit. Accordingly, even though the torque saturation is being generated, it is possible to suppress that the target acceleration exceeding the capability of the motor is set and the acceleration control becomes unstable.

Also, according to the motor control apparatus, after the target acceleration is once limited to the acceleration upper limit, the target acceleration corresponding to the acceleration upper limit is continuously set to supply a deficiency of the acceleration, regardless of whether the target acceleration corresponding to the target acceleration trajectory becomes less than the acceleration upper limit.

Therefore, in the related art, when the target acceleration is limited to the acceleration upper limit, the speed at the end of the acceleration does not reach the target speed. In contrast, according to the motor control apparatus of this disclosure, it is possible to appropriately accelerate the motor to the intended speed (target speed) while limiting the target acceleration to the acceleration upper limit.

According to this disclosure, although the new target acceleration trajectory is set by using the trajectory setting unit to adjust the speed of the motor to the target speed. At this time, the target acceleration trajectory is set taking into consideration the moving state of the motor. Accordingly, according to the motor control apparatus of this disclosure, it is possible to adjust the motor speed to the target speed while suppressing the instability of the acceleration control.

Accordingly, when this disclosure is applied to a control system, with which it is required to accelerate the motor to the target speed, it is possible to realize the appropriate acceleration control.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Figure 1:
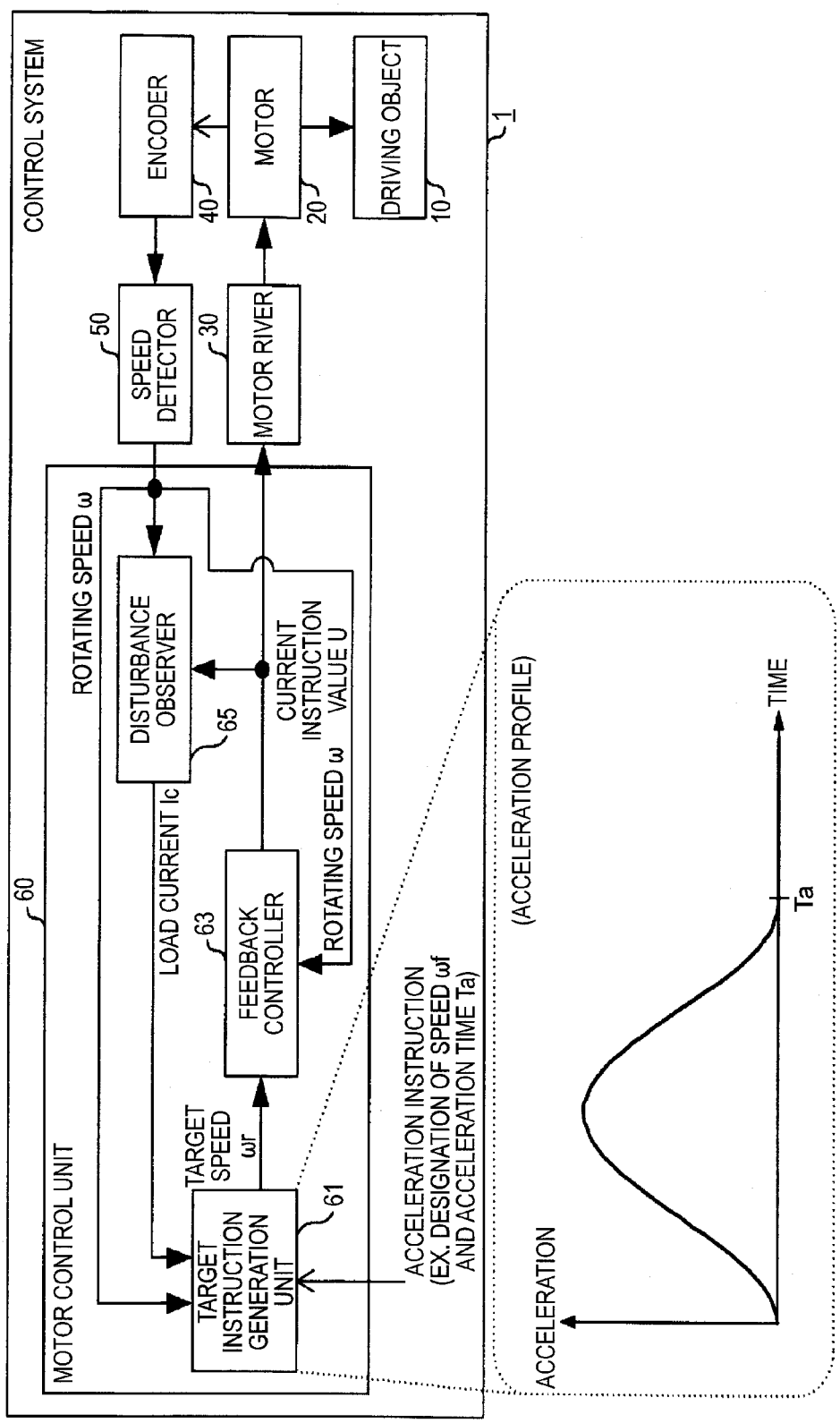
FIG. 1 is a block diagram illustrating a configuration of a control system.

Hereinafter, illustrative embodiments of this disclosure will be described with reference to the drawings. As shown in FIG. 1, a control system 1 of an illustrative embodiment has a motor (direct-current motor) 20 that drives a driving object 10, a motor driver 30, a rotary encoder 40 that is connected to a rotational shaft of the motor 20, a speed detector 50 that detects rotating speed $\omega$ of the motor 20, based on an output signal of the rotary encoder 40, and a motor control unit 60 that calculates a control input (operation amount) for the motor 20.

The control system 1 is incorporated into an electrical apparatus such as image forming apparatus, image reading apparatus and the like and controls the motor in accordance with an instruction input from a main control unit (main micro-computer and the like) of the electrical apparatus. In case that the electrical apparatus is an image forming apparatus (for example, inkjet printer) that conveys a recording head in a main scanning direction, conveys a sheet in a sub-scanning direction and thus forms an image on the sheet, the driving object 10 may correspond to a conveyance mechanism (printing mechanism) of a carriage mounting the recording head thereto, a sheet conveyance mechanism and the like. Meanwhile, in case that the electrical apparatus is an image reading apparatus of a flat bed type that conveys a line sensor and reads a document on a platen, the driving object 10 may correspond to a conveyance mechanism of the line sensor. In case that the electrical apparatus is an image reading apparatus of an auto document feeder (ADF) type, the driving object 10 may include a document conveyance mechanism that conveys a document of a object to be read.

Figure 2:
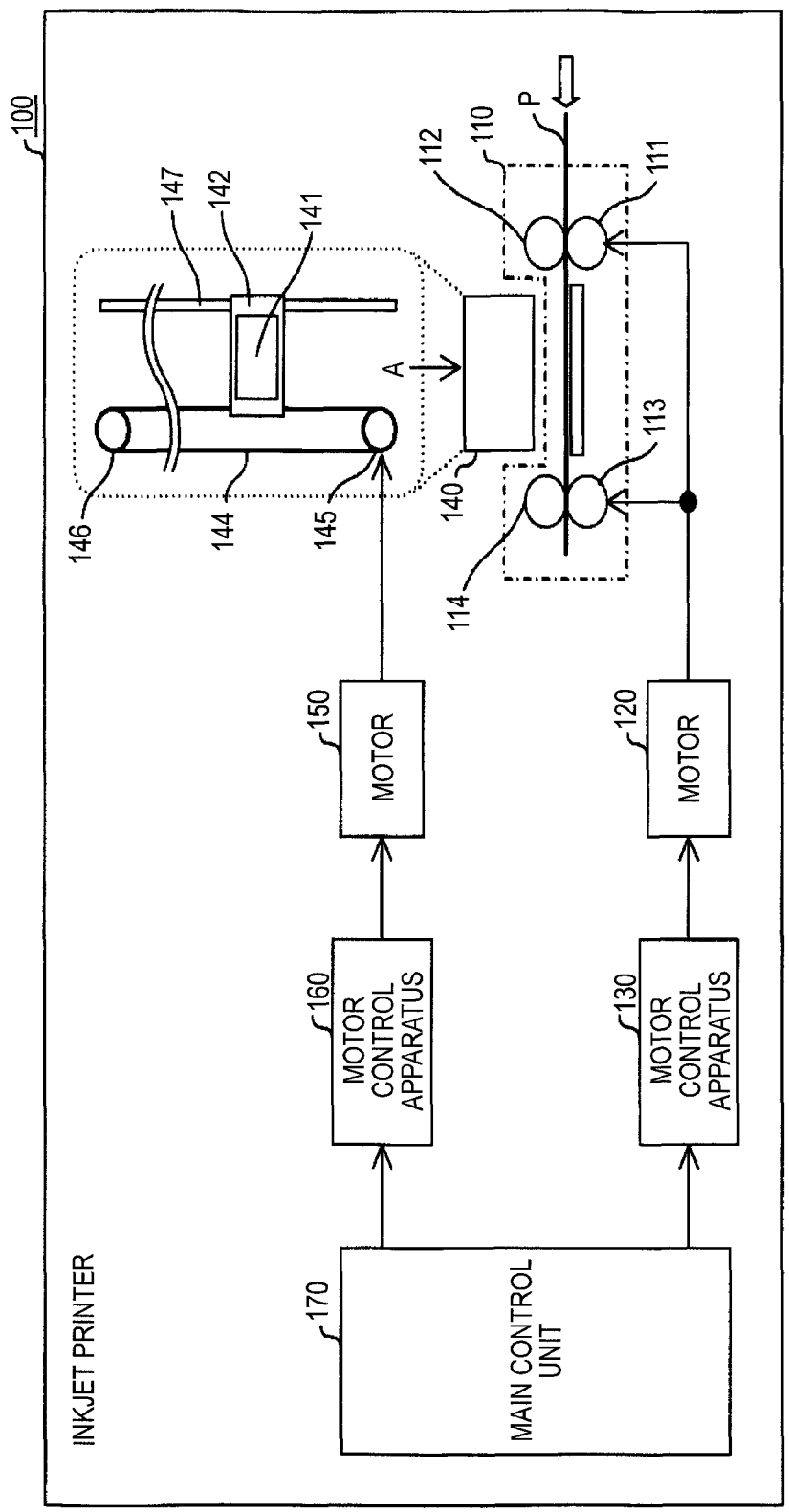
FIG. 2 is a block diagram illustrating a configuration of an inkjet printer.

FIG. 2 illustrates an example in which the control system 1 is incorporated into an inkjet printer 100 being the image forming apparatus. The inkjet printer 100 shown in FIG. 2 has a sheet conveyance mechanism 110, a motor 120 that applies power to the sheet conveyance mechanism 110, a motor control apparatus 130 that controls the motor 120, a printing mechanism 140, a motor 150 that applies power to the printing mechanism 140, a motor control apparatus 160 that controls the motor 150, and a main control unit 170.

The sheet conveyance mechanism 110 has a conveyance roller 111 and a sheet discharge roller 113 to which the power is applied from the motor 120, a driven roller 112 that is rotated as the conveyance roller 111 rotates while holding a sheet P conveyed from a sheet feeding tray (not shown) between the conveyance roller 111 and the driven roller 112, and a driven roller 114 that is rotated as the sheet discharge roller 113 rotates while sandwiching the sheet P conveyed from the conveyance roller 111 between the sheet discharge roller 113 and the driven roller 114.

As described above, the sheet P is fed to the sheet conveyance mechanism 110 from the sheet feeding tray. The fed sheet P is conveyed by rotation of the conveyance roller 111 and the sheet discharge roller 113, so that it is discharged to a sheet discharge tray (not shown).

The motor control apparatus 130 controls the motor 120 and drives the sheet conveyance mechanism 110 (particularly, the conveyance roller 111 and the sheet discharge roller 113) in accordance with the instruction from the main control unit 170 of the inkjet printer 100, thereby realizing the conveyance control on the sheet P.

In the meantime, the printing mechanism 140 has a carriage 142 that mounts a recording head (so-called inkjet head) 141 thereto, a belt 144 coupled to the carriage 142, a driving pulley 145 and a driven pulley 145 on which the belt 144 is wound and a guide shaft 147 that is inserted into the carriage 142 and restrains moving of the carriage 142 in a main scanning direction. The driving pulley 145 is rotated by power fed from the motor 150. Thereby, the belt 144 rotates. Accompanied by the rotation of the belt 144, the carriage 142 moves in the main scanning direction while the moving thereof is restrained by the guide shaft 147. In the meantime, the detailed configuration of the printing mechanism 140 shown in an area surrounded by the broken line of FIG. 2 illustrates the detailed configuration of the printing mechanism 140, when seeing the printing mechanism 140 along the arrow A direction of FIG. 2.

The motor control apparatus 160 controls the motor 150 and drives the printing mechanism 140 (particularly, the carriage 142) in accordance with the instruction from the main control unit 170 of the inkjet printer 100, thereby realizing the conveyance control on the recording head 141.

Also, the main control unit 170 inputs the instructions to the motor control apparatus 130 and the motor control apparatus 160 and performs processing of conveying the sheet P in the sub-scanning direction by a predetermined amount and then conveying the recording head 141 in the main scanning direction, sequentially. When conveying the recording head 141, the main control unit controls the recording head 141 to discharge ink droplets and to thus form an image on the sheet P while conveying the recording head 141 at constant speed. By repeating such control, the main control unit 170 forms an image, which is based on print data input from the outside, on the sheet P by the sheet conveyance mechanism 110 and the printing mechanism 140.

The configuration of the control system 1 is applied to at least one of the motor control apparatus 130 and the motor control apparatus 160 of the inkjet printer 100. That is, at least one of the motor control apparatus 130 and the motor control apparatus 160 is mounted with the components of the control system 1 except for the driving object 10 and the motor 20. The motor 120 and the motor 150 correspond to the motor 20 of the control system 1.

For example, the control system 1 is incorporated into the image forming apparatus (inkjet printer 100), as described above. Based on a current instruction value U input from the motor control unit 60, the motor driver 30 of the control system 1, which is incorporated into the electrical apparatus such as image forming apparatus as described above, inputs, a driving current corresponding to the current instruction value U to the motor 20 and thus drives the motor 20. The current instruction value U corresponds to the control input for the motor 20.

In the meantime, the rotary encoder 40 is a well-known rotary encoder and outputs a pulse signal when the motor 20 rotates by a predetermined amount. Specifically, the rotary encoder 40 is configured to output, as the pulse signal, an A-phase signal and a B-phase signal whose phases are different by π/2. The speed detector 50 detects the rotating speed ω of the motor 20, based on the A-phase signal and the B-phase signal output from the rotary encoder 40, and inputs the detected rotating speed to the motor control unit 60.

Figure 9:
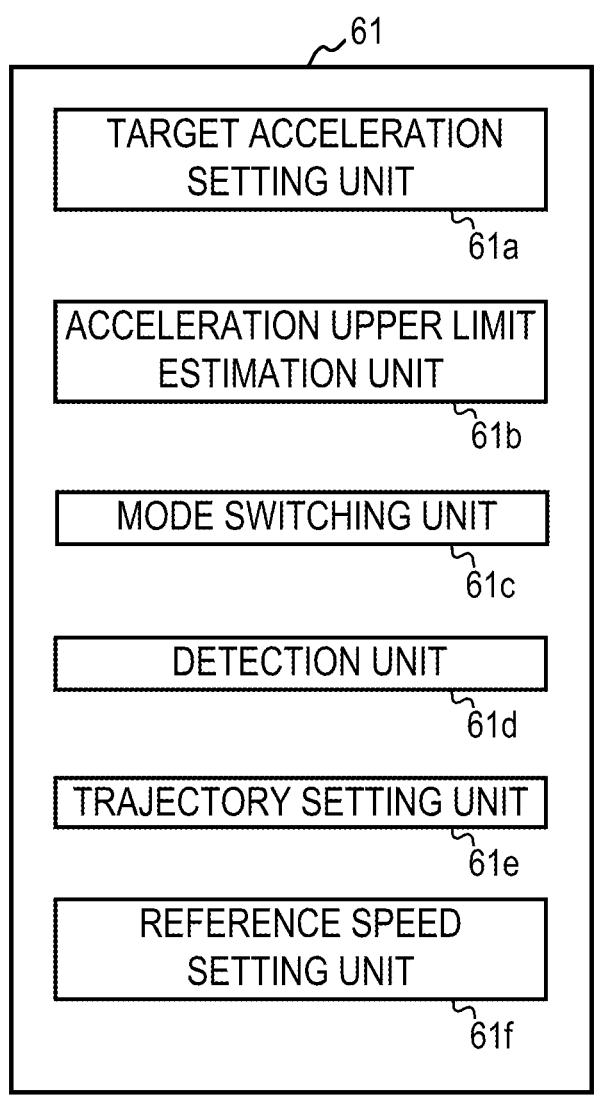
FIG. 9 is a block diagram of a target instruction generation unit.

In addition, the motor control unit 60 has a target instruction generation unit 61, a feedback controller 63 and a disturbance observer 65. The target instruction generation unit 61 sets target acceleration Ar at each time point in accordance with a preset acceleration profile, integrates the target acceleration Ar to calculate target speed ωr at each time point corresponding to the target acceleration Ar and inputs the target speed ωr to the feedback controller 63. The target instruction generation unit 61 may function as or include a target acceleration setting unit 61a, an acceleration upper limit estimation unit 61b, a mode switching unit 61c, a detection unit 61d, a trajectory setting unit 61e, and a reference speed setting unit 61f, as shown in FIG. 9.

The feedback controller 63 calculates a deviation (e=ωr−ω) between the target speed ωr and the rotating speed ω, based on the target speed ωr input from the target instruction generation unit 61 and the rotating speed ω of the motor 20 input from the speed detector 50, and calculates the current instruction value U corresponding to the deviation e. That is, the feedback controller inputs the deviation e to a predetermined transfer function, which is determined at a design stage in accordance with a characteristic of a plant, and thus calculates the current instruction value U.

Also, the disturbance observer 65 estimates disturbance, based on the current instruction value U (control input) output from the feedback controller 63 and the rotating speed ω (control output) of the motor 20 input from the speed detector 50, and outputs information of load current Ic (motor current at which load torque due to the disturbance and motor torque are balanced), as the estimated disturbance value. In the meantime, the above function of the disturbance observer 65 is known, so that the detailed description thereof is omitted.

The information of the load current Ic output from the disturbance observer 65 and the information of the rotating speed ω of the motor 20 output from the speed detector 50 are input into the target instruction generation unit 61. Based on the input information, the target instruction generation unit 61 of this illustrative embodiment estimates an acceleration upper limit Am of the motor 20. The acceleration upper limit Am can be estimated in accordance with a following equation by using the rotating speed ω of the motor 20 and the load current Ic.

[equation 1]

$$A_m = \frac{K_t}{J_n \cdot R_n}(V_m - R_n I_c - K_e \omega) \qquad (1)$$

A symbol Kt indicates a torque constant, a symbol Jn indicates load inertia and a symbol Rn indicates an armature resistance. Also, a symbol Vm indicates a rated voltage of the motor 20 and a symbol Ke indicates a counter-electromotive force constant. Kt, Jn, Rn, Vm and Ke are predetermined at the design stage and set in the target instruction generation unit 61. That is, the target instruction generation unit 61 estimates the acceleration upper limit Am according to the equation (1), based on Kt, Jn, Rn, Vm and Ke, the load current Ic changing in time and the rotating speed ω of the motor 20.

In the meantime, the first term Kt·Vm/(Jn·Rn) of the equation (1) indicates the acceleration upper limit by the rated voltage Vm, the second term Kt·Ic/Jn indicates a lowering of the acceleration upper limit caused due to the load current Ic, and the third term Kt·Ke·ω/(Jn·Rn) indicates a lowering of the acceleration upper limit caused due to current lowering by the counter-electromotive force.

The detailed configuration of the target instruction generation unit 61 estimating the acceleration upper limit Am is described. When an acceleration instruction is input from the outside (for example, the main micro-computer of the electrical apparatus), the target instruction generation unit 61 generates (sets) an acceleration profile representing a target acceleration trajectory, in which a speed is from zero to the speed ωf as shown with the solid line in a lower part of FIG. 1, based on the information of the speed ωf and acceleration time Ta designated with the acceleration instruction. Here, the speed ωf corresponds to speed at the end of acceleration. Also, the acceleration time Ta corresponds to the acceleration time from speed of zero to speed ωf.

The acceleration profile is generated as a function, in which time-series data of the target acceleration An or input parameter is time t and an output parameter is the target acceleration An. When generating a function as the acceleration profile, a target instruction generation unit 61 determines a designed parameter of a predetermined function (for example, trigonometric function), in which the designed parameter is not determined yet, based on the information of the speed ωf and acceleration time Ta designated with the acceleration instruction, so that the target instruction generation unit 61 generates (sets) a function representing a target acceleration trajectory suitable for the speed ωf and acceleration time Ta. Specifically, in this illustrative embodiment, it is generated that an acceleration profile representing a monomodal target acceleration trajectory, in which a temporal differentiation of the acceleration at time t=0 and at time t=Ta is zero and the acceleration An at time t=Ta/2 indicates a maximum value Ap, the acceleration An monotonically increases from time t=0 to time t=Ta/2, the acceleration An monotonically decreases from time t=Ta/2 to time t=Ta and an amount of increase in speed from time t=0 becomes ωf at time t=Ta.

The target instruction generation unit 61 sets the target acceleration Ar at each time point in accordance with the acceleration profile (hereinafter, referred to as 'standard acceleration profile') generated based on the acceleration instruction as described above. That is, the target instruction generation unit sets, as the target acceleration Ar, the target acceleration An corresponding to the preset standard acceleration profile. Then, the target instruction generation unit inputs the target speed ωr corresponding to the target acceleration Ar to the feedback controller 63, thereby performing the acceleration control on the motor 20 (further, driving object 10).

At this time, the target instruction generation unit 61 of this illustrative embodiment estimates the acceleration upper limit Am according to the equation (1) and corrects the target acceleration Ar, as required, when performing the acceleration control on the motor 20 based on the standard acceleration profile. That is, the target instruction generation unit corrects the target acceleration Ar from the target acceleration An corresponding to the standard acceleration profile to the acceleration upper limit Am.

Figure 3:
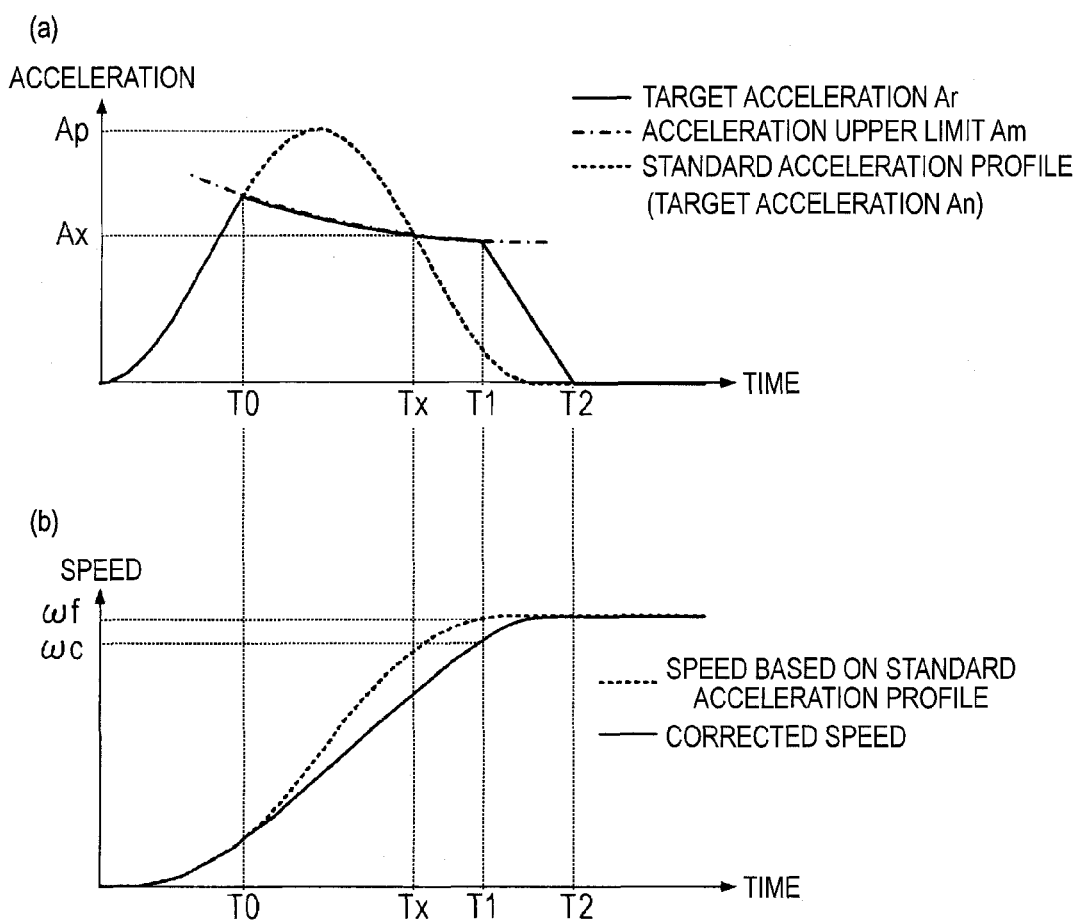
FIG. 3 illustrates a method of setting target acceleration.

A part (a) of FIG. 3 is a graph in which an example of the target acceleration Ar after correction is shown with the solid line, an example of the target acceleration before correction (target acceleration An corresponding to the standard acceleration profile) is shown with the broken line, and an example of the acceleration upper limit Am is shown with the dashed-dotted line. In a part (a) of FIG. 3, the target acceleration in an area (an area that is not corrected), in which the target acceleration An and the target acceleration Ar after correction coincide with each other, is shown with the solid line.

According to the example shown in a part (a) of FIG. 3, the target acceleration An corresponding to the standard acceleration profile exceeds the acceleration upper limit Am at the periphery of a point, at which the target acceleration An corresponding to the standard acceleration profile is maximum. At this time, the target instruction generation unit 61 corrects the target acceleration Ar from the target acceleration An to the acceleration upper limit Am (refer to the time T0 in parts (a) and (b) of FIG. 3). In this illustrative embodiment, by doing so, when the target acceleration Ar is unrealizable acceleration, the target acceleration Ar is corrected to the realizable acceleration upper limit Am, so that the acceleration control is suppressed from being unstable.

Figure 8:
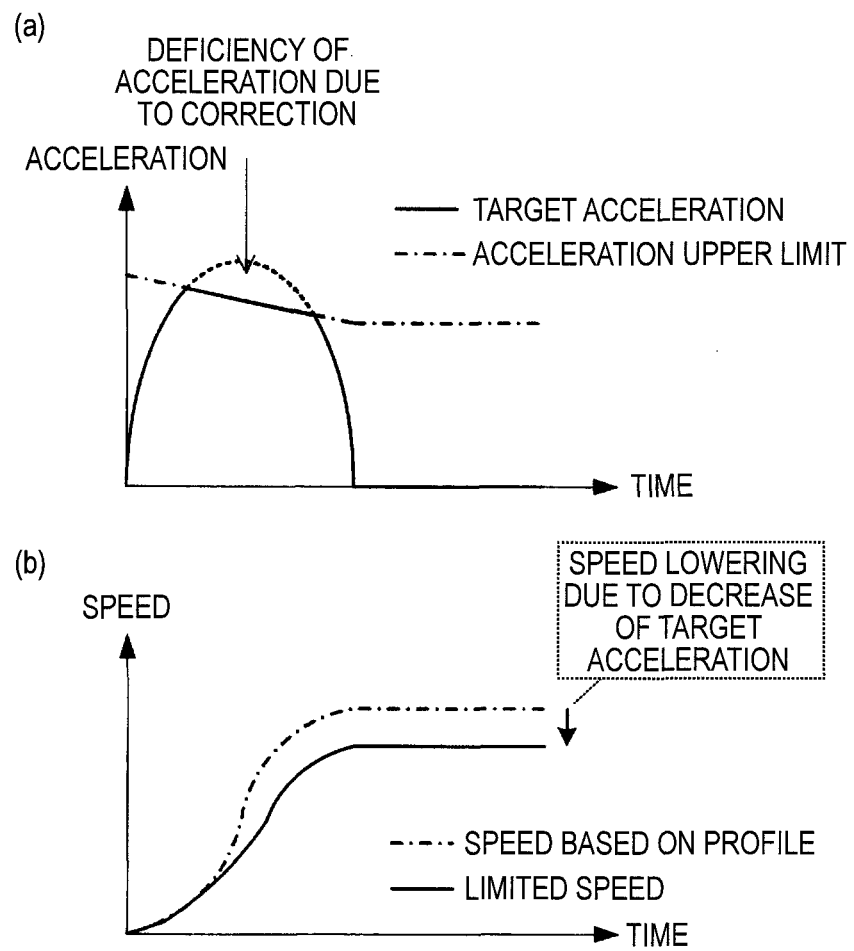
FIG. 8 illustrates the related art.

According to the related art of simply limiting the target acceleration Ar to the acceleration upper limit Am, when the target acceleration An corresponding to the standard acceleration profile becomes less than the acceleration upper limit Am, if the target acceleration Ar is once limited so as to bring back the target acceleration Ar from the acceleration upper limit Am to the target acceleration An corresponding to the standard acceleration profile (refer to FIG. 8), it is not possible to accelerate the motor 20 to the speed ωf designated by the acceleration instruction, as shown in a part (b) of FIG. 8.

With considering above, when the target acceleration An corresponding to the standard acceleration profile exceeds the acceleration upper limit Am, the target instruction generation unit 61 of this illustrative embodiment corrects the target acceleration Ar to the acceleration upper limit Am until a predetermined condition is satisfied. When the predetermined condition is satisfied, the target instruction generation unit newly generates an acceleration profile (hereinafter, referred to as 'acceleration profile after correction') and sets the target acceleration Ar in accordance with the acceleration profile after correction. By the operation of the target instruction generation unit 61 as described above, in this illustrative embodiment, a deficiency of the acceleration, which is caused as the target acceleration Ar is limited to the acceleration upper limit Am, is supplemented, so that the rotating speed ω at the end of the acceleration is adjusted to the designated speed ωf.

Specifically, in this illustrative embodiment, after the target acceleration Ar is once corrected to the acceleration upper limit Am, even when the target acceleration An corresponding to the standard acceleration profile becomes the acceleration upper limit Am or less, the acceleration upper limit Am is set as the target acceleration Ar and the switching speed ωc is set. Then, at a time point at which the rotating speed ω of the motor 20 reaches the switching speed ωc (refer to time T1 in parts (a) and (b) of FIG. 3), the acceleration profile of correction is generated based on the acceleration upper limit Am (target acceleration Ar) and the rotating speed ωc' of the motor 20 at that time point. The acceleration profile after correction is an acceleration profile, in which the target acceleration becomes zero at the designated speed ωf and the acceleration of the motor 20 is ended. Then, the target instruction generation unit 61 sets the target acceleration Ar in accordance with the acceleration profile after correction and inputs the corresponding target speed ωr to the feedback controller 63, thereby adjusting the rotating speed ω of the motor 20 (further, the driving object 20) to the speed ωf.

In the meantime, based on the rotating speed ωx of the motor 20, which is obtained from the speed detector 50 at time Tx, at which the target acceleration An corresponding to the standard acceleration profile becomes the acceleration upper limit Am or less, and the target acceleration Ar at time Tx (hereinafter, referred to as 'target acceleration Ax'), the switching speed ωc is set so that the higher the target acceleration Ax at time Tx, the lower the switching speed ωc, and so that the lower the target acceleration Ax at time Tx, the higher the switching speed ωc.

The switching speed ωc as described above is to suppress the rapid decrease of the acceleration by performing the acceleration control in accordance with the acceleration profile after correction, after the rotating speed ω of the motor 20 reaches the switching speed ωc, and to supplement the deficiency of the acceleration in a short time by prolonging the time period in which the acceleration upper limit Am is set as the target acceleration Ar.

The switching speed ωc may be calculated in accordance with a following equation by using a ratio Ax/Ap of the target acceleration Ax at time Tx and the maximum value Ap (refer to a part (a) of FIG. 3) of the target acceleration An corresponding to the standard acceleration profile. At this time, a symbol ωx is the rotating speed ω of the motor 20 at time Tx.

[equation 2]

$$\omega_c = \omega_f - A_x/A_p(\omega_f - \omega_x) \quad (2)$$

Figure 4:
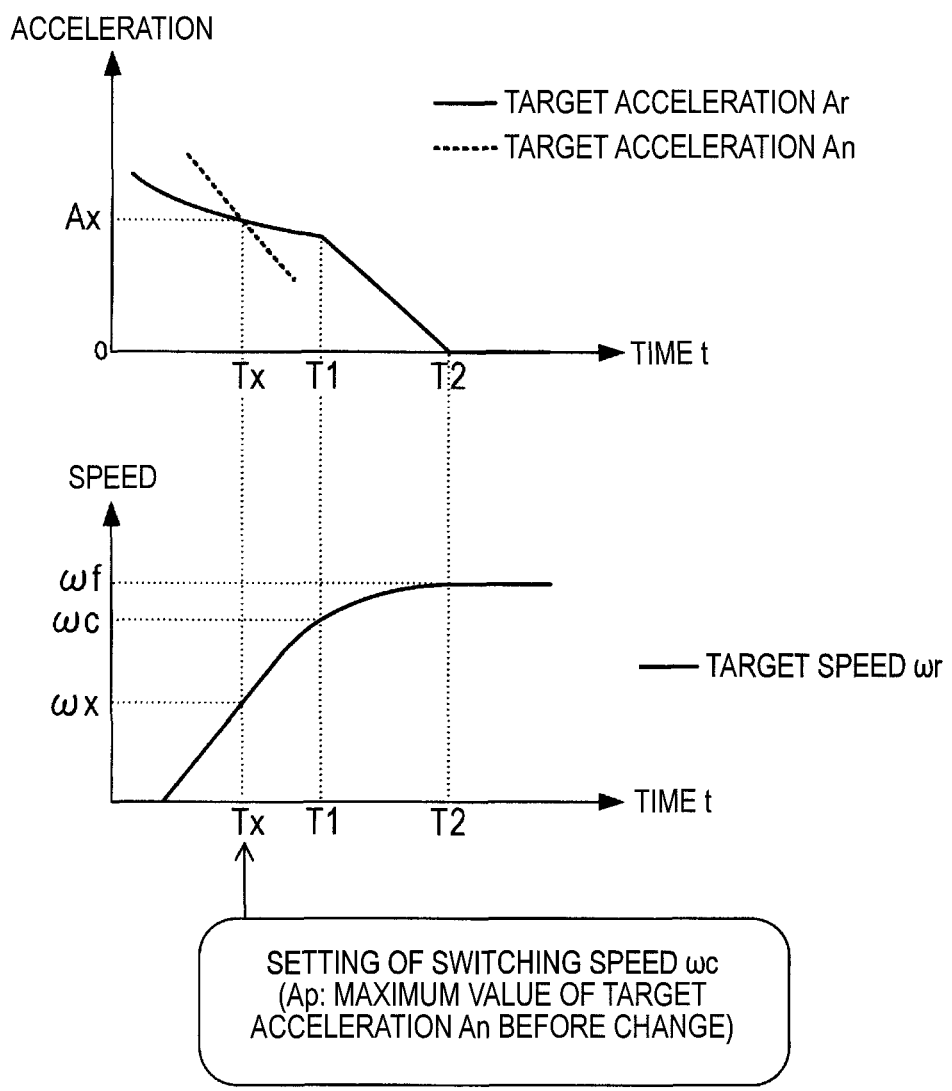
FIG. 4 illustrates a method of setting switching speed.

The term (ωf−ωx) in the equation (2) functions as a term for setting the switching speed ωc to be in a speed area between the current rotating speed ωx and the speed ωf at the end of the acceleration. In FIG. 4, setting aspects of the switching speed ωc are shown by graphs.

Also, the target instruction generation unit 61 generates an acceleration profile (acceleration profile after correction), in which target acceleration Az at time t becomes acceleration corresponding to a following equation, at a time point (time T1 in FIGS. 3 to 5) at which the rotating speed ω of the motor 20 becomes the switching speed ωc or more, based on the acceleration Ac that is the acceleration upper limit Am (target acceleration Ar) and the rotating speed ωc' of the motor 20 at that time point.

[equation 3]

$$A_z = -\frac{A_c}{T2-T1} \cdot (t-T2) \quad (3)$$

$$T2 = 2\frac{\omega_f - \omega_c'}{Ac} + T1 \quad (4)$$

Figure 5:
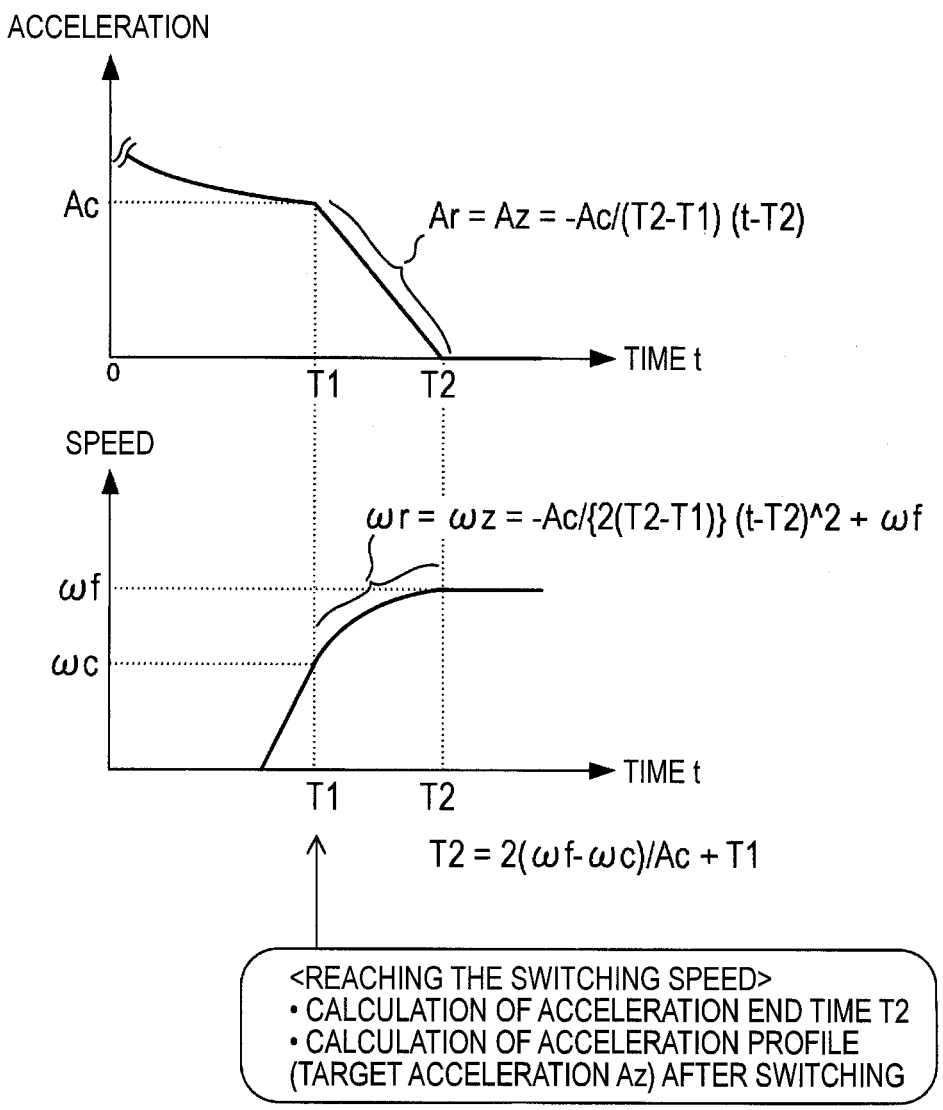
FIG. 5 illustrates a method of generating an acceleration profile after correction.

The upper part of FIG. 5 indicates a shape of the acceleration profile after correction. At this time, FIG. 5 illustrates an example in which the speed $\omega c'$ at the time of generation of the acceleration profile after correction coincides with the switching speed $\omega c$. The acceleration profile is an acceleration profile in which the target acceleration (initial value of the target acceleration) at time t=T1 is the acceleration upper limit Am at that time point, the target acceleration at the end of the acceleration (time t=T2) is zero, the acceleration monotonically increases from time t=T1 to time t=T2 and the target speed $\omega r$ becomes the speed $\omega f$ at time T2 at which the acceleration ends.

The target instruction generation unit 61 sets the target acceleration Ar at each time, based on the acceleration profile after correction. That is, the target instruction generation unit sets, as the target acceleration Ar, the target acceleration Az corresponding to the acceleration profile after correction. The target instruction generation unit 61 of this illustrative embodiment sets the target acceleration Ar, as described above, so that it controls the rotating speed $\omega$ at the end of the acceleration to be the designated speed $\omega f$ while limiting the target acceleration Ar to the acceleration upper limit Am during the acceleration.

The lower part of FIG. 5 illustrates a trajectory of the target speed $\omega r$ corresponding to the acceleration profile shown in the upper part of FIG. 5. When the target acceleration Ar (=Az) is set in accordance with the equation (3), the target speed $\omega r$ (=$\omega z$) is expressed by a following equation.

[equation 4]

$$\omega_z = -\frac{A_c}{2(T2-T1)} \cdot (t-T2)^2 + \omega_f \quad (5)$$

In this illustrative embodiment, since the acceleration profile after correction is expressed by a linear function of time t, the speed $\omega z$ is expressed by a quadratic function of the rotating speed $\omega f$ in which the acceleration is zero at the end time T2 of the acceleration.

Subsequently, the processing that is executed by the target instruction generation unit 61 is described with reference to FIGS. 6 and 7. When an acceleration instruction is input, the target instruction generation unit 61 generates (sets) a standard acceleration profile, based on the speed $\omega f$ and the like designated by the acceleration instruction, as described above. After that, the target instruction generation unit executes acceleration control processing shown in FIG. 6.

Figure 6:
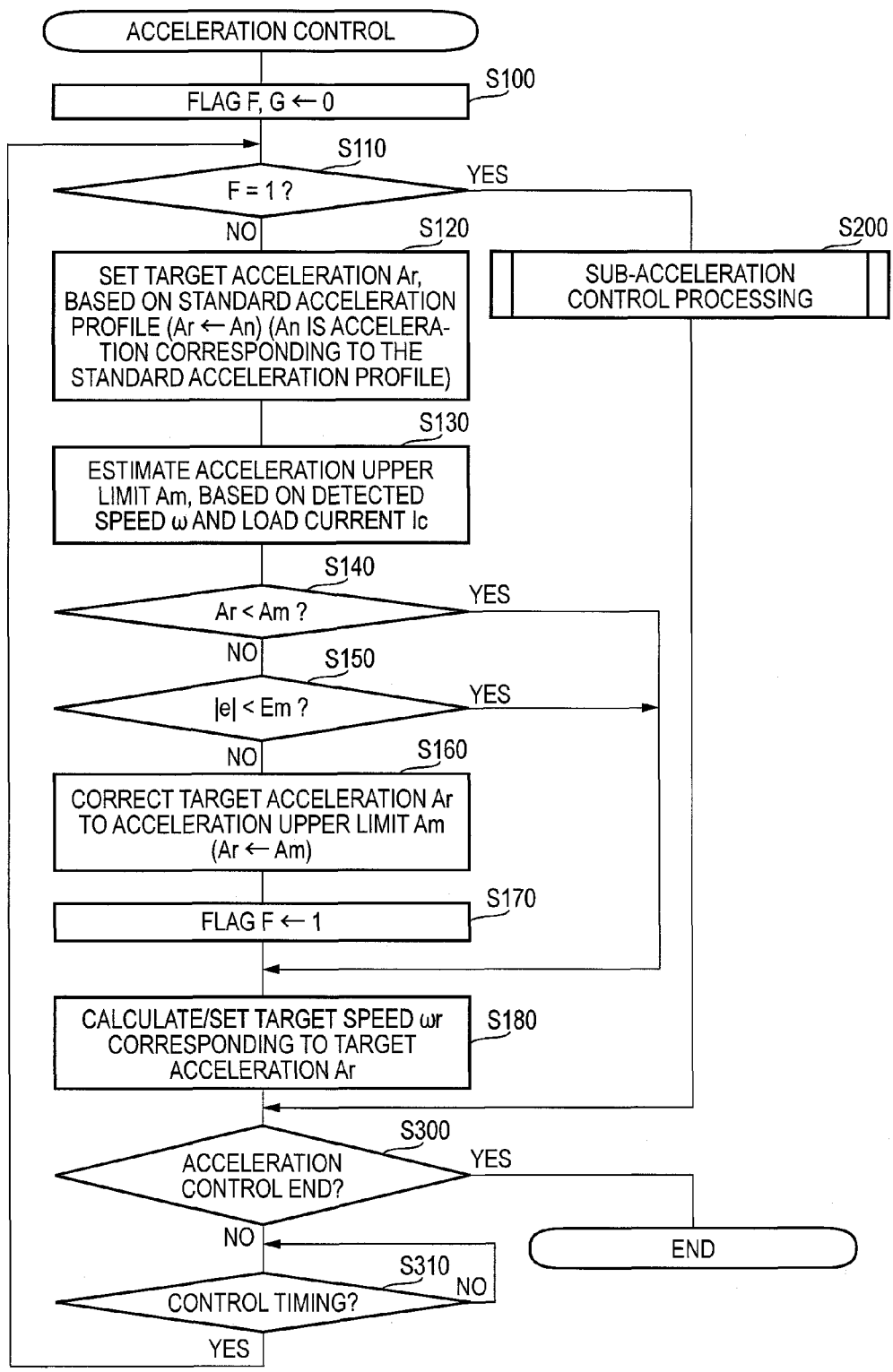
FIG. 6 is a flowchart illustrating an acceleration control processing that is executed by a target instruction generation unit.

When the acceleration control processing shown in FIG. 6 starts, the target instruction generation unit 61 initializes a flag F and a flag G to be zero (S100). Then, the target instruction generation unit determines whether the flag F is set to be a value of 1 (S110). When the flag F is not set to be a value of 1 (No in S110), the process proceeds to S120, and when the flag F is set to be a value of 1 (Yes in S110), the process proceeds to S200.

When the process proceeds to S120, the target instruction generation unit 61 sets, as the target acceleration An at current time t that is represented by the standard acceleration profile, the target acceleration Ar that is used to control the motor 20. Also, the target instruction generation unit estimates the current acceleration upper limit Am in accordance with the equation (1), based on the rotating speed $\omega$ at the current time t that is obtained from the speed detector 50, and the load current Ic at the current time t that is obtained from the disturbance observer 65 (S130). Then, the target instruction generation unit determines whether the target acceleration Ar set in S120 is less than the acceleration upper limit Am calculated in S130 (S140).

Here, when it is determined that the target acceleration Ar is less than the acceleration upper limit Am (Yes in S140), the target instruction generation unit 61 proceeds to S180, determines the target acceleration An based on the standard acceleration profile, as the target acceleration Ar to be used for the motor control, calculates the target speed $\omega r$ corresponding to the determined target acceleration Ar (=An) and inputs the calculated target speed to the feedback controller 63.

In the meantime, when a control period (a calculation period of the target speed $\omega r$) is $\Delta T$, the target instruction generation unit calculates, as the target speed $\omega r$ corresponding to the target acceleration Ar of this time, a value that is obtained by adding a value (Ar·$\Delta T$) to the target speed $\omega b$ of previous time. That is, the target instruction generation unit calculates, as the target speed $\omega r$, a temporal integration of the target acceleration At from the start of the acceleration control.

The feedback controller 63 calculates the current instruction value U, based on the deviation e between the target speed $\omega r$ calculated as described above and the rotating speed $\omega$ of the motor 20 obtained from the speed detector 50. The motor driver 30 drives the motor 20, based on the current instruction value U input from the feedback controller 63. By this operation, the control system 1 of this illustrative embodiment controls the rotation of the motor 20 so that the rotating speed $\omega$ of the motor 20 follows the target speed $\omega r$.

After S180, the target instruction generation unit 61 determines whether the ending condition of the acceleration control is satisfied (S300). When the ending condition is not satisfied (No in S300), the target instruction generation unit stands by for time corresponding to the control period $\Delta T$, based on the time measured by a timer (not shown) and the like (S310). Thereby, the target instruction generation unit stands by until a next control timing comes.

Then, when a next control timing comes (Yes in S310), the process proceeds to S110. When the flag F is zero (No in S110), the target instruction generation unit executes the process after S120.

When it is determined in S140 that the target acceleration Ar is the acceleration upper limit Am or more (No in S140), the target instruction generation unit 61 proceeds to S150 and determines whether an absolute value |$\omega r-\omega$| of the deviation e between the target speed $\omega r$ corresponding to the current target acceleration Ar and the current rotating speed $\omega$ obtained from the speed detector 50 is less than a prescribed value Em. When it is determined that the absolute value of the deviation e is less than the prescribed value Em (Yes in S150), the process proceeds to S180 without correcting the target acceleration Ar, determines the target acceleration An based on the standard acceleration profile, as the target acceleration Ar to be used for the motor control, and inputs the target speed $\omega r$ corresponding to the determined target acceleration Ar to the feedback controller 63, like the above case in which it is determined that the target acceleration Ar is less than the acceleration upper limit Am. Then, the process proceeds to S300.

On the other hand, when it is determined that the absolute value of the deviation e is the prescribed value or greater (No in S150), the target instruction generation unit 61 proceeds to S160 and corrects the target acceleration Ar from the target acceleration An to the estimated acceleration upper limit Am (Ar=Am). After that, the target instruction generation unit sets the flag F to be a value of 1 (S170) and proceeds to S180.

Also, in S180 just after executing S160 and S170, the target instruction generation unit determines the estimated acceleration upper limit Am, as the target acceleration Ar to be used for the motor control, calculates the target speed $\omega r$ corresponding to the target acceleration Ar after correction and inputs the calculated target speed to the feedback controller 63 (processing at time T0 in parts (a) and (b) of FIG. 3). After that, the process proceeds to S300.

In this illustrative embodiment, when the acceleration control starts, the target acceleration Ar corresponding to the standard acceleration profile is set as described above. When the target acceleration Ar is the acceleration upper limit Am or more and the absolute value of the deviation e is the prescribed value Em or more, the target acceleration Ar is limited to the acceleration upper limit Am. On the other hand, when the absolute value of the deviation e is smaller than the prescribed value Em, the target acceleration Ar is not limited to the acceleration upper limit Am. This is not to perform an unnecessary switching of the control mode. That is, even when target acceleration Ar is not limited to the acceleration upper limit Am during the period in which the absolute value of the deviation e is smaller, it is unlikely that the control will be unstable.

Figure 7:
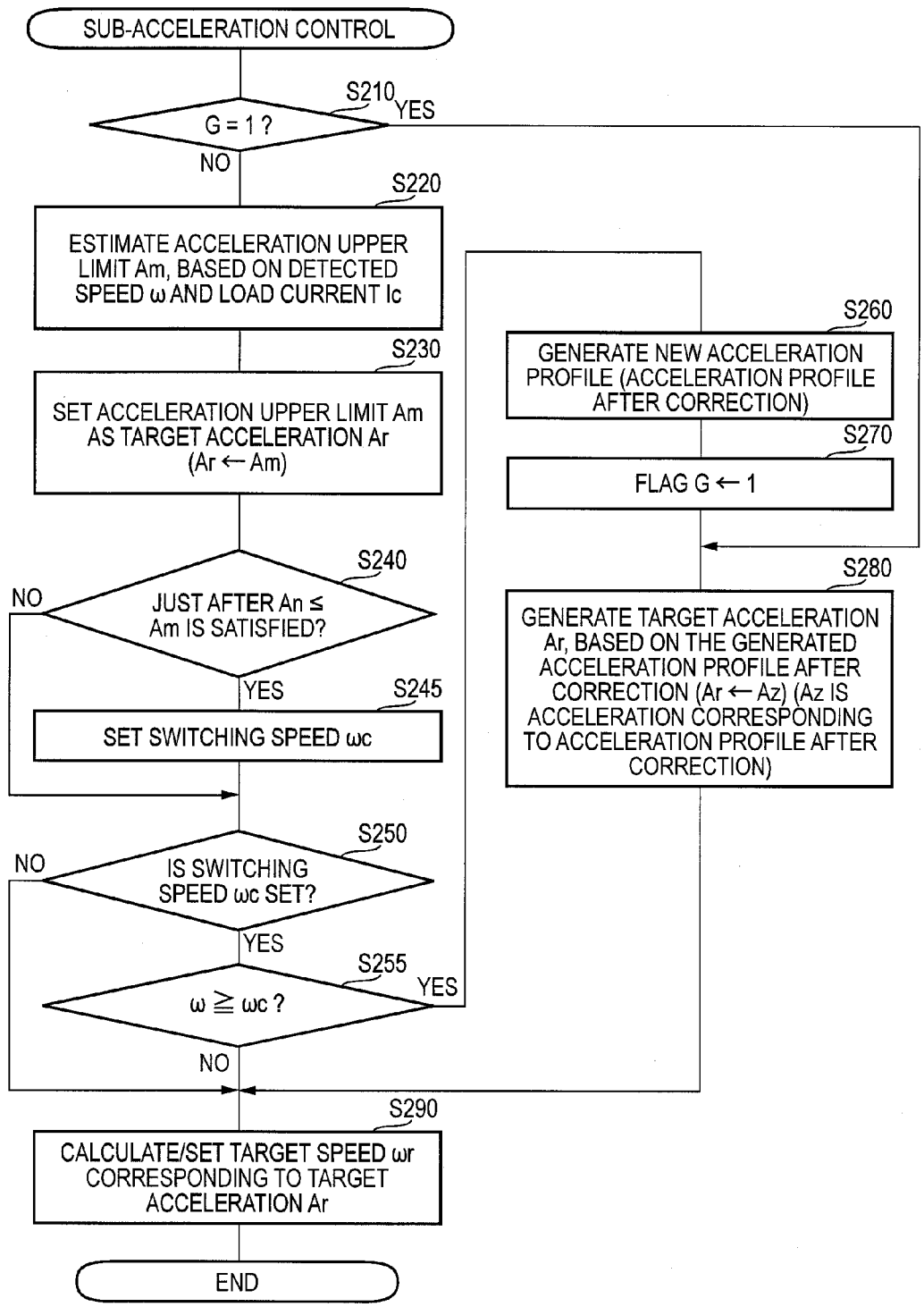
FIG. 7 is a flowchart illustrating a sub-acceleration processing that is executed by the target instruction generation unit.

When the target acceleration Ar is once corrected to the acceleration upper limit Am, the target instruction generation unit 61 determines in the affirmative in S110 as the value of the flag F is switched from zero to one (1) and executes sub-acceleration control processing shown in FIG. 7 in S200, instead of the processing of S120 to S180.

When the sub-acceleration control processing starts, the target instruction generation unit 61 determines whether the flag G is set to be a value of 1 (S210). When the flag G is not set to be a value of 1 (No in S210), the target instruction generation unit estimates the current acceleration upper limit Am in accordance with the equation (1), based on the rotating speed $\omega$ of the motor 20 at current time t, which is obtained from the speed detector 50, and the load current Ic at current time t, which is obtained from the disturbance observer 65 (S220), like the processing of S120. Then, the target instruction generation unit sets the estimated target upper limit Am, as the target acceleration Ar (S230).

Also, when the above processing is terminated, the target instruction generation unit 61 compares the target acceleration An at current time t corresponding to the standard acceleration profile and the estimated current acceleration upper limit Am, thereby determining whether the time is a time just after target acceleration An becomes the acceleration upper limit Am or less (S240). Here, when the target acceleration An of previous time and the acceleration upper limit Am satisfy a relation of An>Am and the target acceleration An of this time and the acceleration upper limit Am satisfy a relation of An≤Am, the target instruction generation unit determines (in the affirmative) that the time is a time just after target acceleration An becomes the acceleration upper limit Am or less. In the other cases, it is determined as negative.

When it is determined that the time is a time just after target acceleration An becomes the acceleration upper limit Am or less (Yes in S240), the target instruction generation unit 61 proceeds to S245 and sets the switching speed $\omega c$. That is, as shown in parts (a) and (b) of FIG. 4, the target instruction generation unit calculates and sets the switching speed $\omega c$ in accordance with the equation (2), based on the speed $\omega f$ at the end of the acceleration designated with the acceleration instruction, the rotating speed $\omega x$ at current time t=Tx obtained from the speed detector 50, the target acceleration Ax at current time Tx, and the maximum value Ap of the target acceleration An corresponding to the standard acceleration profile. Then, the process proceeds to S250.

On the other hand, when a result of the determination in S240 is negative, the target instruction generation unit skips over S245 and proceeds to S250. Also, in S250, the target instruction generation unit determines whether the switching speed $\omega c$ is set or not. When the switching speed is not set (No in S250), the target instruction generation unit skips over S255 and proceeds to S290.

To the contrary, when it is determined that the switching speed $\omega c$ is set (Yes in S250), the target instruction generation unit 61 compares the rotating speed $\omega$ at current time t obtained from the speed detector 50 and the switching speed $\omega c$, thereby determining whether the rotating speed $\omega$ of the motor 20 is the switching speed $\omega c$ or more (S255). When it is determined that the rotating speed $\omega$ of the motor 20 is not the switching speed $\omega c$ or more (No in S255), the process proceeds to S290.

When the process proceeds to S290 as a negative result of the determination in S250 or S255, the target instruction generation unit 61 determines the acceleration upper limit Am as the target acceleration Ar to be used for the motor control, calculates the target speed $\omega r$ corresponding to the target acceleration Ar, and inputs the calculated target speed to the feedback controller 63. After starting the processing of setting the acceleration upper limit Am, as the target acceleration Ar, the target instruction generation unit 61 continues to control the motor at the acceleration upper limit Am as described above until the rotating speed $\omega$ of the motor 20 becomes the switching speed $\omega c$ or more.

In the meantime, when it is determined that the current rotating speed $\omega$ is the switching speed $\omega c$ or more (Yes in S255), the target instruction generation unit 61 proceeds to S260 and generates the acceleration profile after correction in accordance with the equations (3) and (4), based on the target acceleration Ar (=Ac) at current time t=T1 set in S230, the current rotating speed $\omega c'$ of the motor 20 obtained from the speed detector 50 and the speed $\omega f$ at the end of the acceleration. Then, the target instruction generation unit sets the flag G to be a value of 1 (S270).

After that, the target instruction generation unit 61 proceeds to S280 and sets, as the target acceleration Ar to be adopted, the target acceleration Az at current time t corresponding to the acceleration profile after correction. At this time, since the target acceleration Az at time t=T1, at which the rotating speed $\omega$ of the motor 20 becomes the switching speed $\omega c$ or more, coincides with the target acceleration Ar (=Ac) at time t=T1 set in S230, as shown with the equation (3), the target instruction generation unit, in S280 just after generating the target acceleration profile after correction, continues the processing without substantially correcting the target acceleration Ar set in S230.

When the target instruction generation unit 61 ends the processing in S280, the process proceeds to S290, and the target instruction generation unit 61 determines, as the target acceleration to be used for the motor control, the target acceleration Az corresponding to the acceleration profile after correction, calculates the target speed $\omega r$ corresponding to the target acceleration Ar, and inputs the calculated target speed to the feedback controller 63. After that, the target instruction generation unit ends the sub-acceleration control processing and proceeds to S300.

In the sub-acceleration control processing of a next control period of the acceleration profile after correction has been generated, the flag G is set to be the value of 1. Accordingly, the target instruction generation unit 61 determines in the affirmative in S210, proceeds to S280, and the target instruction generation unit 61 sets, as the target acceleration Ar, the target acceleration Az at current time t indicated by the acceleration profile after correction. In S290, the target instruction generation unit calculates the target speed ωr corresponding to the target acceleration Ar based on the acceleration profile after correction and inputs the calculated target speed ωr to the feedback controller 63.

The target instruction generation unit 61 sets the target acceleration Ar (=Az) corresponding to the acceleration profile after correction from the time point, at which the rotating speed ω of the motor 20 becomes the switching speed ωc or more, as described above, thereby smoothly adjusting the rotating speed ω of the motor 20 to the speed ωf.

The configuration of the control system 1 of this illustrative embodiment has been described. According to this illustrative embodiment, when the target acceleration Ar corresponding to the standard acceleration profile exceeds the acceleration upper limit Am, the target acceleration Ar is corrected to the acceleration upper limit Am so that the acceleration control is not unstable. While the deficiency of the acceleration caused due to the correction of the target acceleration Ar is supplemented by continuing the acceleration control by the acceleration upper limit Am, the rotating speed ω of the motor 20 is appropriately adjusted to the speed ωf by the control switching by the switching speed ωc set in correspondence to the degree of the acceleration upper limit Am.

Therefore, when the control system 1 is applied to a system that accelerates the driving object 10 to the designated speed and adjusts the speed of the driving object 10 to the designated speed, even if the original target acceleration An exceeds the acceleration upper limit Am, it is possible to appropriately accelerate the driving object 10 up to the designated speed.

That is, according to the related art, when the instability of the control caused due to the torque saturation is avoided by limiting the target acceleration Ar, it is caused that the motor 20 cannot be accelerated to the designated speed ωf. However, according to this illustrative embodiment, it is possible to appropriately accelerate the driving object 10 up to the designated speed ωf while avoiding the instability of the control due to the torque saturation.

When the control system 1 is applied to the system that controls the sheet conveyance mechanism, for example, it is possible to suppress the throughput of the sheet conveyance from being lowered, which is caused due to the deficiency of the acceleration generated by limiting the target acceleration Ar to the acceleration upper limit Am. In addition, when the control system 1 is applied to the system that controls the carriage conveyance mechanism, it is possible to appropriately convey the carriage at intended constant speed after the acceleration.

In particular, according to this illustrative embodiment, the acceleration upper limit Am is estimated by adding the deficiency of the acceleration upper limit due to the counter-electromotive force and the deficiency of the acceleration upper limit due to the disturbance. Thus, since it is possible to estimate the acceleration upper limit Am in high precision, it is possible to suppress the instability of the control and to thus realize the motor control of high precision.

Although the illustrative embodiment of this disclosure has been described, the relation between the terms is described in detail. The processing of S130 and S220 that is executed by the target instruction generation unit 61 of this illustrative embodiment corresponds to an example of the processing performed by the acceleration upper limit estimation unit, and the processing of S120, S160, S180, S230, S280 and S290 that is executed by the target instruction generation unit 61 corresponds to an example of the processing performed by the target acceleration setting unit. Also, the feedback controller 63 corresponds to an example of the control unit, and the operation, in which the target instruction generation unit 61 switches the processing in accordance with the determinations of S110, S140, S150 and S210, corresponds to an example of the operation performed by the mode switching unit.

Also, the processing S255 executed by the target instruction generation unit 61 corresponds to an example of the processing performed by the detection unit, the processing S260 executed by the target instruction generation unit 61 corresponds to an example of the processing executed by the trajectory setting unit, and the processing S245 executed by the target instruction generation unit 61 corresponds to an example of the processing executed by the reference speed setting unit. In addition, a combination of the sheet conveyance mechanism 110 and the printing mechanism 140 corresponds to an example of the image forming mechanism.

Also, this disclosure is not limited to the above illustrative embodiment and has a variety of aspects. For example, the control system 1 may be applied to a variety of electrical apparatuses in addition to the image forming apparatus and the image reading apparatus. That is, this disclosure performs the control when accelerating the motor 20 up to the speed ωf and may be applied to various technical fields insofar as it is used for such control.

Also, in the above illustrative embodiment, the feedback control is performed, based on the target speed ωr corresponding to the target acceleration Ar. However, a configuration may be also possible in which a target position is calculated by double integration of the trajectory-set target acceleration Ar and the target position is input to the feedback controller to perform the position control and to realize the acceleration control of the motor 20 (further, the driving object 20).

Also, in the above illustrative embodiment, the acceleration upper limit Am is estimated, based on the information of the load current Ic output from the disturbance observer 65, the information of the rotating speed ω of the motor 20 output from the speed detector 50 and the preset parameters. However, the acceleration upper limit Am may be also estimated, based on a value of a detector that directly detects a deficiency of the acceleration upper limit due to the load current Ic or a deficiency of the current due to the counter-electromotive force.

In addition, the method of setting the switching speed ωe or acceleration profile after correction shown in the equations (2) to (4) is exemplary and a variety of aspects may be adopted regarding the method.

What is claimed is:
1. A motor control apparatus that accelerates a motor to a target speed, the motor control apparatus comprising:
a target acceleration setting unit, which sets a target acceleration at each time point from start of an acceleration control;

a control unit, which adjusts a control input for the motor and controls the motor, based on the target acceleration set by the target acceleration setting unit;

an acceleration upper limit estimation unit, which estimates an upper limit of acceleration achievable by the motor;

a mode switching unit;

a detection unit, which detects that a speed of the motor reaches a predetermined reference speed less than the target speed; and a trajectory setting unit, wherein:

when the acceleration control starts, the mode switching unit controls the target acceleration setting unit to execute a first setting processing, in which the target acceleration at each time point is set corresponding to a first target acceleration trajectory;

when it is determined that the target acceleration corresponding to the first target acceleration trajectory exceeds the acceleration upper limit at a time point, after the determined time point, the mode switching unit controls the target acceleration setting unit to execute a second setting processing, in which a target acceleration is set corresponding to the acceleration upper limit, instead of the first setting processing;

when the detection unit detects that the speed of the motor reaches the reference speed while the target acceleration setting unit executes the second setting processing, the trajectory setting unit sets a second target acceleration trajectory from that detected time point, based on a moving state of the motor at that time point, and the mode switching unit controls the target acceleration setting unit to execute a third setting processing, in which the target acceleration is set corresponding to the second target acceleration trajectory, instead of the second setting processing.

2. The motor control apparatus according to claim 1, further comprising:

a reference speed setting unit that sets the reference speed, based on the acceleration of the motor after the execution of the second setting processing starts, wherein the reference speed setting unit sets a value of the reference speed, based on the acceleration of the motor at a time of setting the reference speed, and wherein the reference speed setting unit sets a smaller value as the reference speed as the acceleration of the motor is larger, and sets a larger value as the reference speed as the acceleration of the motor is smaller.

3. The motor control apparatus according to claim 1, wherein the trajectory setting unit sets, as an initial value of the target acceleration, the acceleration of the motor at a time point, at which the detection unit detects that the speed of the motor reaches the reference speed, and sets the second target acceleration trajectory, in which the target acceleration monotonically decreases.

4. The motor control apparatus according claim 1, further comprising:

a disturbance observer that estimates disturbance, based on the control input for the motor and a control output corresponding to the control input, wherein the acceleration upper limit estimation unit estimates the acceleration upper limit of the motor, based on the disturbance estimated by the disturbance observer.

5. The motor control apparatus according to claim 1, wherein, when the target acceleration corresponding to the first target acceleration trajectory exceeds the acceleration upper limit and when a deviation between the speed of the motor at that time point and the target speed corresponding to the first target acceleration trajectory exceeds a predetermined value, the mode switching unit controls the target acceleration setting unit to execute the second setting processing.

6. The motor control apparatus according to claim 1, wherein, when the speed of the motor is the target speed, the target acceleration in the first target acceleration trajectory and the second target acceleration trajectory becomes zero.

7. An image forming apparatus comprising:

a motor;

an image forming mechanism, which is driven by power from the motor, which conveys at least one of a sheet and a recording head capable of forming an image on the sheet, and which forms an image on the sheet through the recording head; and the motor control apparatus for controlling the motor according to claim 1.

8. The motor control apparatus according to claim 2, wherein the reference speed setting unit sets the reference speed at a time point, at which the target acceleration corresponding to the first target acceleration trajectory becomes the acceleration upper limit or less.

9. A motor control apparatus that accelerates a motor to a target speed, the motor control apparatus comprising:

a motor controller that, when executing instructions, causes the apparatus to function as:

a target acceleration setting unit, which sets a target acceleration at each time point from start of an acceleration control;

a control unit, which adjusts a control input for the motor and controls the motor, based on the target acceleration set by the target acceleration setting unit;

an acceleration upper limit estimation unit, which estimates an upper limit of acceleration achievable by the motor;

a mode switching unit;

a detection unit, which detects that a speed of the motor reaches a predetermined reference speed less than the target speed; and a trajectory setting unit, wherein:

when the acceleration control starts, the mode switching unit controls the target acceleration setting unit to execute a first setting processing, in which the target acceleration at each time point is set corresponding to a first target acceleration trajectory;

when it is determined that the target acceleration corresponding to the first target acceleration trajectory exceeds the acceleration upper limit at a time point, after the determined time point, the mode switching unit controls the target acceleration setting unit to execute a second setting processing, in which a target acceleration is set corresponding to the acceleration upper limit, instead of the first setting processing;

when the detection unit detects that the speed of the motor reaches the reference speed while the target acceleration setting unit executes the second setting processing, the trajectory setting unit sets a second target acceleration trajectory from that detected time point, based on a moving state of the motor at that time point, and the mode switching unit controls the target acceleration setting unit to execute a third setting processing, in which the target acceleration is set corresponding to the second target acceleration trajectory, instead of the second setting processing.

* * * * *